US012531339B2

(12) United States Patent
Chan

(10) Patent No.: US 12,531,339 B2
(45) Date of Patent: Jan. 20, 2026

(54) HYBRID ANTENNA STRUCTURE

(71) Applicant: Quanta Computer Inc., Taoyuan (TW)

(72) Inventor: Ming-Che Chan, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 85 days.

(21) Appl. No.: 18/435,074

(22) Filed: Feb. 7, 2024

(65) Prior Publication Data

US 2025/0226579 A1 Jul. 10, 2025

(30) Foreign Application Priority Data

Jan. 8, 2024 (TW) ................................ 113200233

(51) Int. Cl.
*H01Q 5/35* (2015.01)
*H01Q 5/20* (2015.01)
*H01Q 9/04* (2006.01)
*H01Q 13/10* (2006.01)

(52) U.S. Cl.
CPC ................ *H01Q 5/35* (2015.01); *H01Q 5/20* (2015.01); *H01Q 9/0421* (2013.01); *H01Q 13/10* (2013.01)

(58) Field of Classification Search
CPC .......... H01Q 5/35; H01Q 5/20; H01Q 9/0421; H01Q 13/10
See application file for complete search history.

(56) References Cited

U.S. PATENT DOCUMENTS

2024/0291150 A1* 8/2024 Lee .......................... H01Q 5/40
2025/0112364 A1* 4/2025 Lee ........................ H01Q 5/314

OTHER PUBLICATIONS

Li, Q., Fang, J., Ding, J., Cao, W., Sun, J., Guo, C., & Liu, T. (2023). A Novel Tuning Fork-Shaped Tri-Band Planar Antenna for Wireless Applications. Electronics, 12(5), 1081. https://doi.org/10.3390/electronics 12051081 (Year: 2023).*

* cited by examiner

*Primary Examiner* — Dieu Hien T Duong
*Assistant Examiner* — Austin M Back
(74) *Attorney, Agent, or Firm* — McClure, Qualey & Rodack, LLP

(57) ABSTRACT

A hybrid antenna structure includes a metal cavity, a dielectric substrate, and an antenna pattern. The metal cavity has a slot. The dielectric substrate is embedded in the slot of the metal cavity. The dielectric substrate has a first surface and a second surface which are opposite to each other. The antenna pattern is distributed over the first surface and the second surface of the dielectric substrate. The slot of the metal cavity and the antenna pattern are excited to generate a first frequency band, a second frequency band, and a third frequency band.

9 Claims, 4 Drawing Sheets

HYBRID ANTENNA STRUCTURE

CROSS REFERENCE TO RELATED APPLICATIONS

This application claims priority of Taiwan Patent Application No. 113200233 filed on Jan. 8, 2024, the entirety of which is incorporated by reference herein.

BACKGROUND OF THE INVENTION

Field of the Invention

The disclosure generally relates to a hybrid antenna structure, and more particularly, to a hybrid antenna structure for improving noise sensitivity.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has poor noise sensitivity, it may degrade the communication quality of the relative mobile device. Accordingly, it has become a critical challenge for designers to design an antenna structure with good noise sensitivity.

BRIEF SUMMARY OF THE INVENTION

In an exemplary embodiment, the invention is directed to a hybrid antenna structure that includes a metal cavity, a dielectric substrate, and an antenna pattern. The metal cavity has a slot. The dielectric substrate is embedded in the slot of the metal cavity. The dielectric substrate has a first surface and a second surface which are opposite to each other. The antenna pattern is distributed over the first surface and the second surface of the dielectric substrate. The slot of the metal cavity and the antenna pattern are excited to generate a first frequency band, a second frequency band, and a third frequency band.

In some embodiments, the metal cavity is configured to improve the noise sensitivity of the hybrid antenna structure.

In some embodiments, the metal cavity is substantially a hollow cuboid without any upper cover.

In some embodiments, the antenna pattern belongs to a PIFA (Planar Inverted F Antenna).

In some embodiments, the antenna pattern includes a main radiation element. The main radiation element has a feeding point and a grounding point. The main radiation element is disposed on the second surface of the dielectric substrate.

In some embodiments, the main radiation element substantially has a relatively long L-shape.

In some embodiments, the antenna pattern further includes a first auxiliary radiation element and a second auxiliary radiation element. The first auxiliary radiation element extends across the main radiation element. The second auxiliary radiation element extends across the main radiation element. The first auxiliary radiation element and the second auxiliary radiation element are disposed on the first surface of the dielectric substrate.

In some embodiments, each of the first auxiliary radiation element and the second auxiliary radiation element substantially has a relatively short L-shape.

In some embodiments, the first frequency band is from 2400 MHz to 2500 MHz, the second frequency band is from 5150 MHz to 5850 MHz, and the third frequency band is from 5925 MHz to 7125 MHz.

In some embodiments, the length of the slot of the metal cavity is from 0.25 to 0.5 wavelength of the first frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
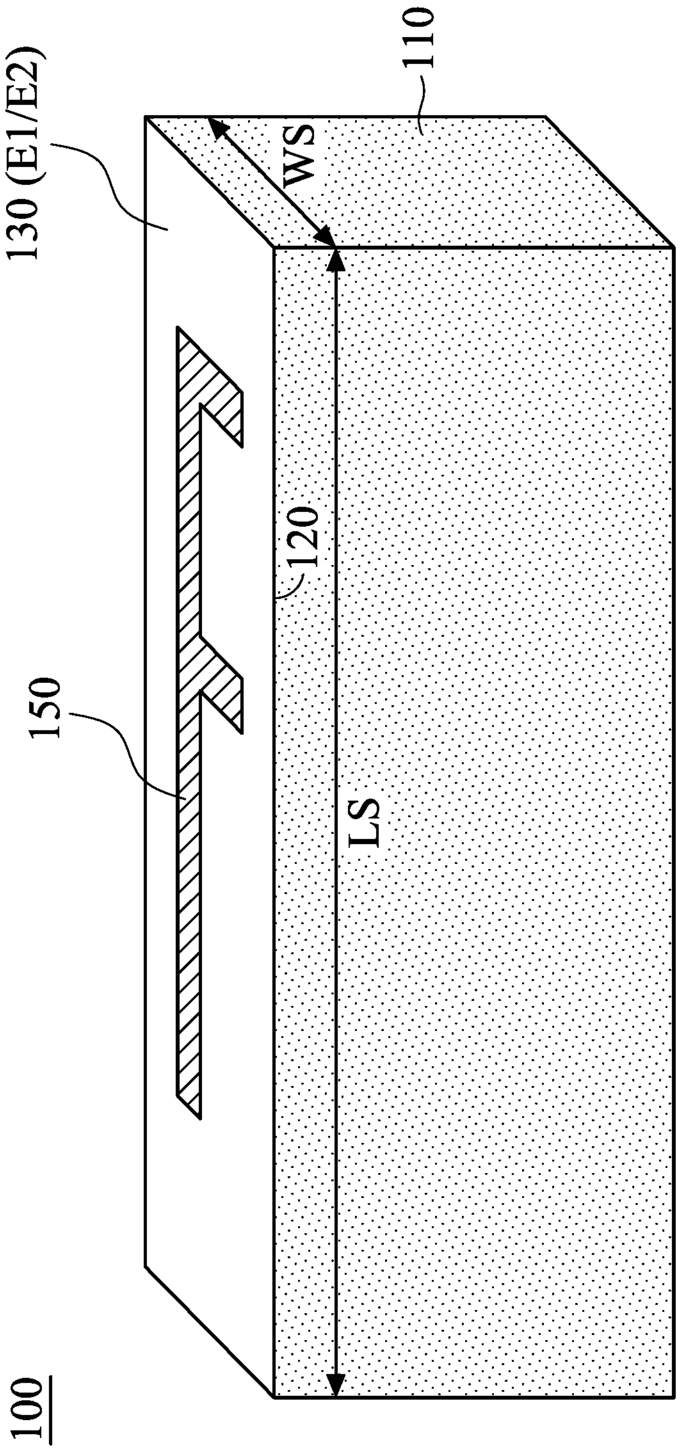
FIG. 1 is a perspective view of a hybrid antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view of a hybrid antenna structure 100 according to an embodiment of the invention. The hybrid antenna structure 100 may be applied to an electronic device, such as a desktop computer, a smart phone, a tablet computer, a notebook computer, a wireless access point, a router, or any device with a communication function. Alternatively, the hybrid antenna structure 100 may be applied to any unit of IOT (Internet of Things), but it is not limited thereto.

As shown in FIG. 1, the hybrid antenna structure 100 at least includes a metal cavity 110, a dielectric substrate 130, and an antenna pattern 150. The antenna pattern 150 may be made of a metal material, such as copper, silver, aluminum, iron, or their alloys.

The metal cavity 110 may be substantially a hollow cuboid without any upper cover. That is, a front side surface, a back side surface, a left side surface, a right side surface, and a bottom surface of the metal cavity 110 may be five metal planes coupled with each other. In addition, the metal cavity 110 also has a slot 120, which may be positioned at a top opening of the metal cavity 110. In some embodiments, the slot 120 of the metal cavity 110 is a closed slot, which may substantially have a straight-line shape or a rectangular shape.

For example, the dielectric substrate 130 may be an FR4 (Flame Retardant 4) substrate, a PCB (Printed Circuit Board), or an FPC (Flexible Printed Circuit), but it is not limited thereto. The dielectric substrate 130 is embedded in the slot 120 of the metal cavity 110. The dielectric substrate 130 has a first surface E1 and a second surface E2 which are opposite to each other. In some embodiments, the dielectric substrate 130 is considered as a nonconductive upper cover of the metal cavity 110.

The antenna pattern 150 is distributed over the first surface E1 and the second surface E2 of the dielectric substrate 130. The shape and type of the antenna pattern 150 are not limited in the invention. For example, the antenna pattern 150 may be a PIFA (Planar Inverted F Antenna), a monopole antenna, a dipole antenna, a loop antenna, a patch antenna, or a helical antenna.

In a preferred embodiment, the slot 120 of the metal cavity 110 and the antenna pattern 150 are excited to generate a first frequency band, a second frequency band, and a third frequency band. The ranges of the aforementioned frequency bands may be adjustable according to different requirements. It should be noted that the metal cavity 110 is configured to improve the noise sensitivity of the hybrid antenna structure 100. Specifically, since the metal cavity 110 blocks the environmental noise, the overall radiation performance of the hybrid antenna structure 100 does not tend to be negatively affected by other adjacent electronic components.

The following embodiments will introduce different configurations and detail structural features of the hybrid antenna structure 100. It should be understood that these figures and descriptions are merely exemplary, rather than limitations of the invention.

Figure 2A:
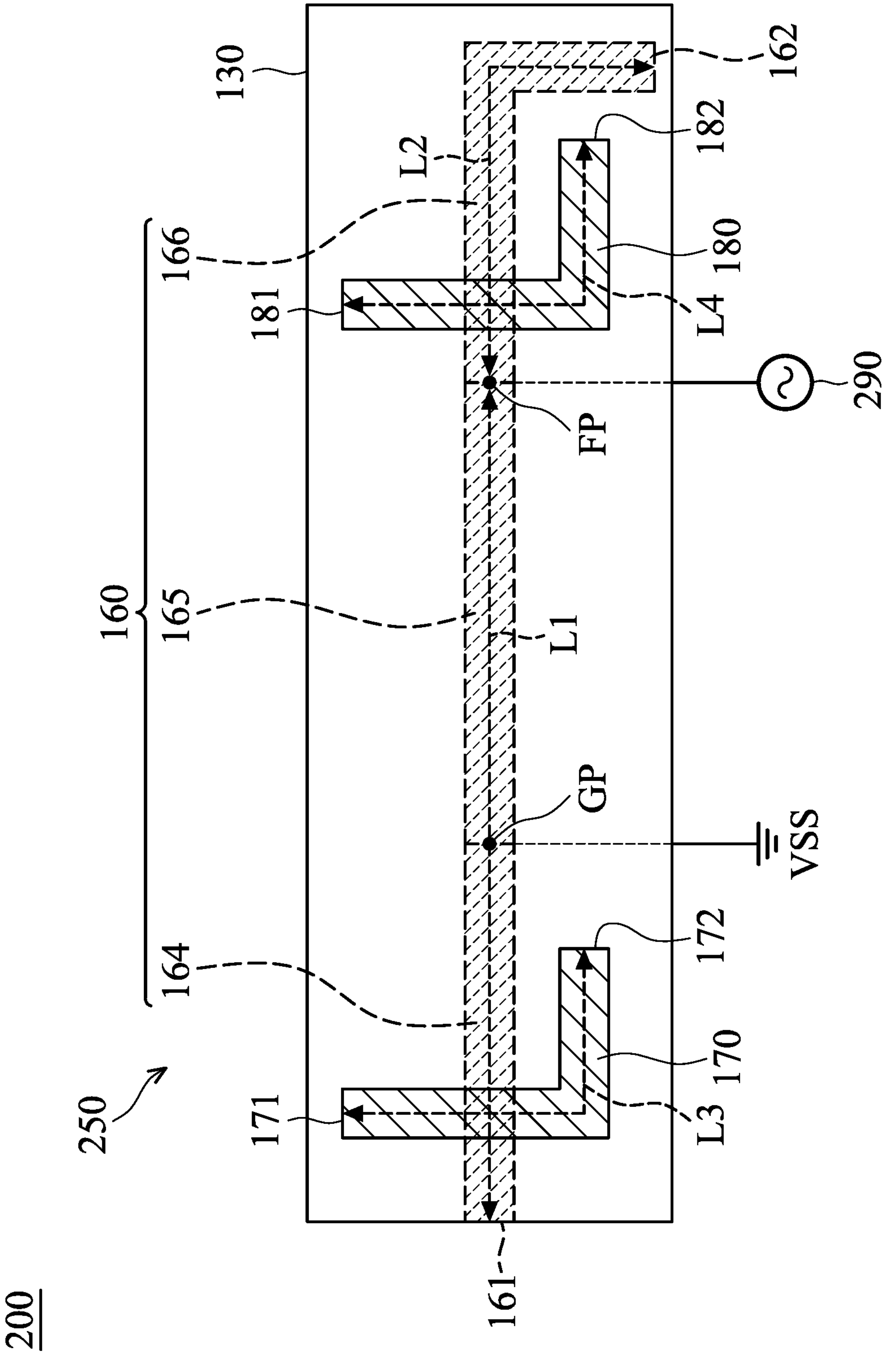
FIG. 2A is a top view of a hybrid antenna structure according to an embodiment of the invention.
Figure 2B:
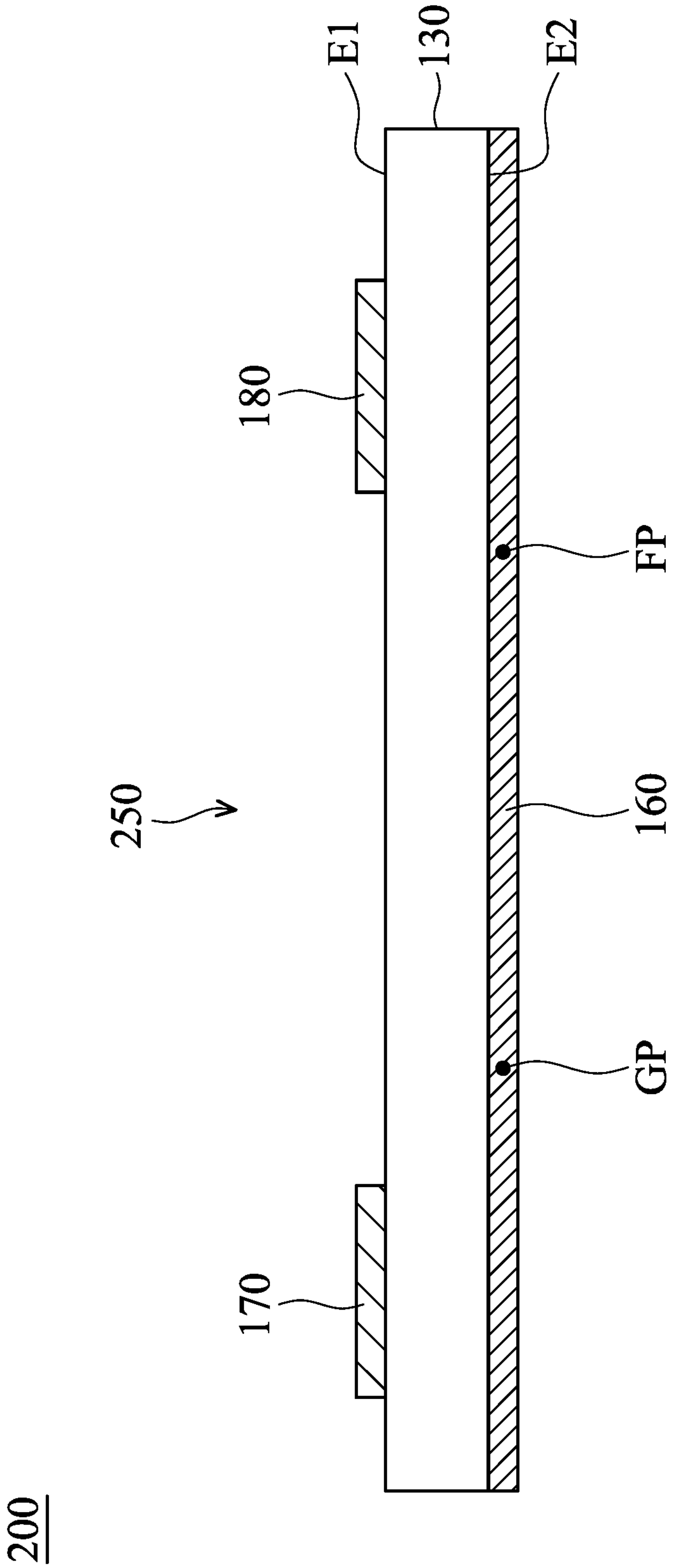
FIG. 2B is a side view of a hybrid antenna structure according to an embodiment of the invention.

FIG. 2A is a top view of a hybrid antenna structure 200 according to an embodiment of the invention. FIG. 2B is a side view of the hybrid antenna structure 200 according to an embodiment of the invention. Please refer to FIG. 2A and FIG. 2B together. FIG. 2A and FIG. 2B are similar to FIG. 1. In the embodiment of FIG. 2A and FIG. 2B, the hybrid antenna structure 200 includes the aforementioned metal cavity 110 (not shown) and the dielectric substrate 130 as well as another antenna pattern 250. The aforementioned metal cavity 110 provides a ground voltage VSS. Specifically, the antenna pattern 250 includes a main radiation element 160, a first auxiliary radiation element 170, and a second auxiliary radiation element 180. The main radiation element 160, the first auxiliary radiation element 170, and the second auxiliary radiation element 180 may all be made of metal materials.

For example, the main radiation element 160 may substantially have a relatively long L-shape. The main radiation element 160 may be disposed on the second surface E2 of the dielectric substrate 130. Specifically, the main radiation element 160 has a first end 161 and a second end 162. The first end 161 and the second end 162 of the main radiation element 160 are two open ends. In some embodiments, the main radiation element 160 includes a first portion 164 adjacent to the first end 161, a second portion 165, and a third portion 166 adjacent to the second end 162, where the third portion 166 is coupled through the second portion 165 to the first portion 164. A grounding point GP is positioned between the first portion 164 and the second portion 165 of the main radiation element 160. The grounding point GP may be further coupled to the ground voltage VSS (or the metal cavity 110). Furthermore, a feeding point FP is positioned between the second portion 165 and the third portion 166 of the main radiation element 160. The feeding point FP may be further coupled to a signal source 290. For example, the signal source 290 may be an RF module for exciting the hybrid antenna structure 200. It should be noted that the term "adjacent" or "close" over the disclosure means that the distance (spacing) between two corresponding elements is smaller than a predetermined distance (e.g., 10 mm or the shorter), or mean that the two corresponding elements directly touch each other (i.e., the aforementioned distance/spacing between them is reduced to 0).

For example, the first auxiliary radiation element 170 may substantially have a relatively short L-shape (compared with the main radiation element 160). The first auxiliary radiation element 170 may be disposed on the first surface E1 of the dielectric substrate 130. Specifically, the first auxiliary radiation element 170 has a first end 171 and a second end 172. The first end 171 and the second end 172 of the first auxiliary radiation element 170 are two open ends. The first end 171 of the first auxiliary radiation element 170 extends across the first portion 164 of the main radiation element 160. That is, the first auxiliary radiation element 170 has a first vertical projection on the second surface E2 of the dielectric substrate 130, and the first vertical projection at least partially overlaps the first portion 164 of the main radiation element 160. In some embodiments, the first auxiliary radiation element 170 is floating, which does not directly touch any other radiation element.

For example, the second auxiliary radiation element 180 may substantially have another relatively short L-shape (compared with the main radiation element 160). The second auxiliary radiation element 180 may be disposed on the first surface E1 of the dielectric substrate 130. Specifically, the second auxiliary radiation element 180 has a first end 181 and a second end 182. The first end 181 and the second end 182 of the second auxiliary radiation element 180 are two open ends. The first end 181 of the second auxiliary radiation element 180 extends across the third portion 166 of the main radiation element 160. That is, the second auxiliary radiation element 180 has a second vertical projection on the second surface E2 of the dielectric substrate 130, and the second vertical projection at least partially overlaps the third portion 166 of the main radiation element 160. In some embodiments, the second auxiliary radiation element 180 is also floating, which does not directly touch any other radiation element.

Figure 3:
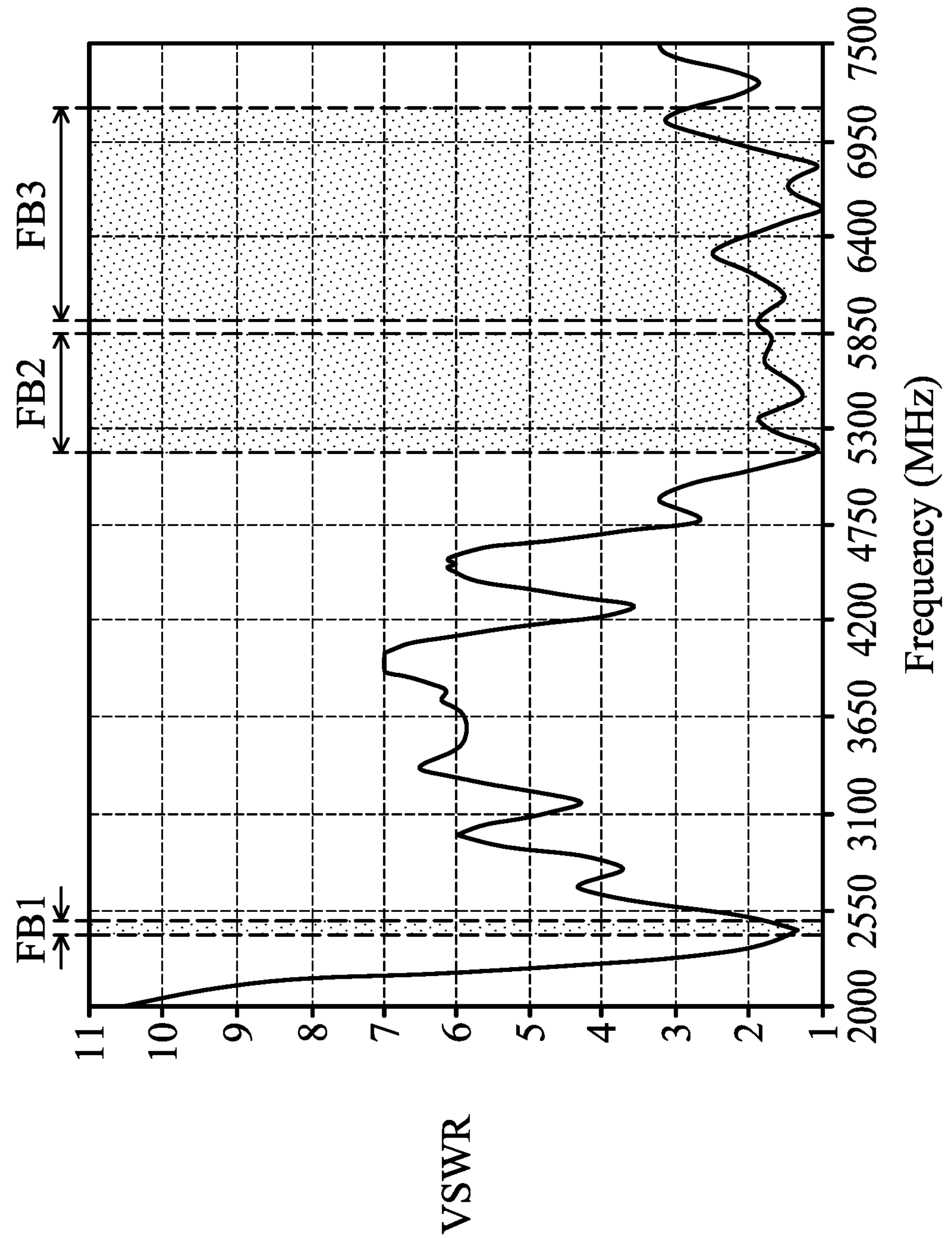
FIG. 3 is a diagram of VSWR (Voltage Standing Wave Ratio) of a hybrid antenna structure according to an embodiment of the invention.

FIG. 3 is a diagram of VSWR (Voltage Standing Wave Ratio) of the hybrid antenna structure 200 according to an embodiment of the invention. The horizontal axis represents the operational frequency (MHz), and the vertical axis represents the VSWR. According to the measurement of FIG. 3, the hybrid antenna structure 200 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the hybrid antenna structure 200 can support the wideband operations of both conventional WLAN (Wireless Local Area Networks) and next-generation Wi-Fi 6E.

In some embodiments, the operational principles of the hybrid antenna structure 200 will be described as follows. The first portion 164 and the second portion 165 of the main radiation element 160 can be excited to generate the first frequency band FB1. The third portion 166 of the main radiation element 160 can be excited to generate the second frequency band FB2. The first auxiliary radiation element 170 and the second auxiliary radiation element 180 can be excited by the main radiation element 160 using a coupling mechanism, so as to generate the third frequency band FB3. The slot 120 of the metal cavity 110 of the hybrid antenna structure 200 can be excited by the antenna pattern 250 using another coupling mechanism, so as to contribute to the first frequency band FB1 and increase its bandwidth. Furthermore, the metal cavity 110 of the hybrid antenna structure 200 can be configured to suppress the environmental noise. For example, according to practical measurement, if the hybrid antenna structure 200 is applied in the environment including DDR5 SDRAM (Double Data Rate Fifth-Generation Synchronous Dynamic Random-Access Memory), the metal cavity 110 can reduce the noise interference by about 7 dBm within the third frequency band FB3, thereby significantly improving the communication quality of the hybrid antenna structure 200.

In some embodiments, the element sizes of the hybrid antenna structure 200 (or 100) will be described as follows. The length LS of the slot 120 of the metal cavity 110 may be from 0.25 to 0.5 wavelength (λ/4~λ2) of the first frequency band FB1 of the hybrid antenna structure 200 (or 100). The width WS of the slot 120 of the metal cavity 110 may be from 8 mm to 12 mm. In the main radiation element 160, the total length L1 of the first portion 164 and the second portion 165 may be substantially equal to 0.25 wavelength (λ/4) of the first frequency band FB1 of the hybrid antenna structure 200, and the length L2 of the third portion 166 may be substantially equal to 0.25 wavelength (λ/4) of the second frequency band FB2 of the hybrid antenna structure 200. The length L3 of the first auxiliary radiation element 170 may be substantially equal to 0.25 wavelength (λ/4) of the third frequency band FB3 of the hybrid antenna structure 200. The length L4 of the second auxiliary radiation element 180 may be substantially equal to 0.25 wavelength (λ/4) of the third frequency band FB3 of the hybrid antenna structure 200. The above ranges of element sizes are calculated and obtained according to many experimental results, and they help to optimize the operational bandwidth and the impedance matching of the hybrid antenna structure 200 (or 100), and also to minimize the environmental noise interference of the hybrid antenna structure 200 (or 100).

The invention proposes a novel hybrid antenna structure. The invention has better noise sensitivity, smaller size, wider bandwidth, and a lower manufacturing cost than conventional designs. Therefore, the invention is suitable for application in a wide variety of electronic devices, as well as the IOT.

It should be noted that the above element sizes, element shapes, and frequency ranges are not limitations of the invention. An antenna designer can fine-tune these settings or values to meet different requirements. It should be understood that the hybrid antenna structure of the invention is not limited to the configurations of FIGS. 1 to 3. The invention may merely include any one or more features of any one or more embodiments of FIGS. 1 to 3. In other words, not all of the features displayed in the figures should be implemented in the hybrid antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid antenna structure, comprising:

a metal cavity, having a slot;

a dielectric substrate, embedded in the slot of the metal cavity, wherein the dielectric substrate has a first surface and a second surface opposite to each other; and an antenna pattern, distributed over the first surface and the second surface of the dielectric substrate;

wherein the slot of the metal cavity and the antenna pattern are excited to generate a first frequency band, a second frequency band, and a third frequency band;

wherein a length of the slot of the metal cavity is from 0.25 to 0.5 wavelength of the first frequency band;

wherein the antenna pattern comprises:

a main radiation element, having a feeding point and a grounding point, wherein the main radiation element is disposed on the second surface of the dielectric substrate;

a first auxiliary radiation element, extending across the main radiation element; and a second auxiliary radiation element, extending across the main radiation element, wherein the first auxiliary radiation element and the second auxiliary radiation element are disposed on the first surface of the dielectric substrate;

wherein both the first auxiliary radiation element and the second auxiliary radiation element are floating.

2. The hybrid antenna structure as claimed in claim 1, wherein the metal cavity is configured to improve noise sensitivity of the hybrid antenna structure.

3. The hybrid antenna structure as claimed in claim 1, wherein the metal cavity is substantially a hollow cuboid without any upper cover.

4. The hybrid antenna structure as claimed in claim 1, wherein the antenna pattern belongs to a PIFA (Planar Inverted F Antenna).

5. The hybrid antenna structure as claimed in claim 1, wherein the main radiation element substantially has a relatively long L-shape.

6. The hybrid antenna structure as claimed in claim 1, wherein each of the first auxiliary radiation element and the second auxiliary radiation element substantially has a relatively short L-shape.

7. The hybrid antenna structure as claimed in claim 1, wherein the first frequency band is from 2400 MHz to 2500 MHz, the second frequency band is from 5150 MHz to 5850 MHz, and the third frequency band is from 5925 MHz to 7125 MHz.

8. The hybrid antenna structure as claimed in claim 1, wherein a length of the first auxiliary radiation element is substantially equal to 0.25 wavelength of the third frequency band.

9. The hybrid antenna structure as claimed in claim 1, wherein a length of the second auxiliary radiation element is substantially equal to 0.25 wavelength of the third frequency band.

* * * * *